(12) United States Patent
Guerreiro et al.

(10) Patent No.: US 10,135,500 B2
(45) Date of Patent: Nov. 20, 2018

(54) GRAPH-BASED DETERMINATION OF INITIAL-SYNCHRONIZATION BEAM SCANNING

(71) Applicant: Telefonaktiebolaget L M Ericsson (publ), Stockholm (SE)

(72) Inventors: Igor Moaco Guerreiro, Fortaleza (BR); Johan Axnäs, Solna (SE); Robert Baldemair, Solna (SE); Dennis Hui, Sunnyvale, CA (US); Eleftherios Karipidis, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 231 days.

(21) Appl. No.: 15/054,675

(22) Filed: Feb. 26, 2016

(65) Prior Publication Data
US 2017/0250739 A1   Aug. 31, 2017

(51) Int. Cl.
*H04B 7/0408* (2017.01)
*H04W 52/02* (2009.01)
(Continued)

(52) U.S. Cl.
CPC ......... *H04B 7/0408* (2013.01); *H04B 7/0426* (2013.01); *H04B 17/391* (2015.01);
(Continued)

(58) Field of Classification Search
CPC .......... H03M 13/1111; H03M 13/1114; H03M 13/1117; H03M 13/112; H04J 14/0221
See application file for complete search history.

(56) References Cited

U.S. PATENT DOCUMENTS 8,340,016 B1    12/2012  Miller et al.
8,909,950 B1 *  12/2014  Levchuk ............. H04W 52/223
                                                      455/418
(Continued)

FOREIGN PATENT DOCUMENTS

WO       2015086079 A1    6/2015

OTHER PUBLICATIONS

3GPP, "3rd Generation Partnership Project; Technical Specification Group Radio Access Network; Evolved Universal Terrestrial Radio Access (E-UTRA); Physical Channels and Modulation (Release 11)", 3GPP TS 36.211 V11.2.0 (Feb. 2013), Feb. 2013, 1-109.
(Continued)

*Primary Examiner* — Shukri Taha
(74) *Attorney, Agent, or Firm* — Murphy, Bilak & Homiller, PLLC

(57) ABSTRACT

Techniques for determining beam-sweeping patterns for synchronization signals transmitted in a region by several access nodes in a network, where each access node is connected to a corresponding array of antenna elements. An example method includes modeling a total power function for the power transmitted in the synchronization signals, as a factor graph having a plurality of check nodes and variable nodes, each check node corresponding to a virtual wireless device in the region and each variable node corresponding to an available beam for an access node. The virtual wireless devices are emulated so as to implement quality-of-service constraints on synchronization signals received by the virtual wireless devices. An iterative message-passing algorithm, such as a min-sum algorithm, is applied to the modeled total power function, to determine a sequence of power levels, for each access node, for sweeping synchronization signal beams, so as to minimize the total power function.

22 Claims, 5 Drawing Sheets

(51) Int. Cl.

| | |
|---|---|
| *H04W 52/22* | (2009.01) |
| *H04W 52/24* | (2009.01) |
| *H04W 56/00* | (2009.01) |
| *H04B 7/0426* | (2017.01) |
| *H04W 52/14* | (2009.01) |
| *H04W 52/32* | (2009.01) |
| *H04W 52/34* | (2009.01) |
| *H04B 17/391* | (2015.01) |

(52) U.S. Cl.
CPC ..... *H04W 52/0206* (2013.01); *H04W 52/143* (2013.01); *H04W 52/228* (2013.01); *H04W 52/241* (2013.01); *H04W 52/247* (2013.01); *H04W 52/325* (2013.01); *H04W 52/346* (2013.01); *H04W 56/002* (2013.01); *H04W 52/245* (2013.01); *H04W 52/32* (2013.01)

(56) References Cited

U.S. PATENT DOCUMENTS

| | | | |
|---|---|---|---|
| 8,910,028 B1* | 12/2014 | Li | H04L 1/005 714/752 |
| 2008/0292031 A1 | 11/2008 | Sibers | |
| 2010/0091729 A1* | 4/2010 | Yang | H04W 72/0453 370/329 |
| 2011/0032149 A1 | 2/2011 | Leabman et al. | |
| 2013/0142082 A1 | 6/2013 | Cavalcante et al. | |
| 2015/0085795 A1 | 3/2015 | Papasakellariou et al. | |
| 2015/0304868 A1 | 10/2015 | Yu et al. | |
| 2016/0373136 A1* | 12/2016 | Ismail | H03M 13/1134 |

OTHER PUBLICATIONS

3GPP, "3rd Generation Partnership Project; Technical Specification Group Radio Access Network; Evolved Universal Terrestrial Radio Access (E-UTRA); Multiplexing and channel coding (Release 12)", 3GPP TS 36.212 V12.6.0 (Sep. 2015), Sep. 2015, 1-95.

3GPP, "3rd Generation Partnership Project; Technical Specification Group Radio Access Network; Evolved Universal Terrestrial Radio Access (E-UTRA); Physical layer procedures (Release 12)", 3GPP TS 36.213 V12.1.0, Mar. 2014, 1-186.

Barati, C. N. et al., "Directional Cell Search for Millimeter Wave Cellular Systems", IEEE 15th International Workshop on Signal Processing Advances in Wireless Communications (SPAWC), 2014, 120-124.

Guerreiro, Igor M. et al., "Power-Efficient Beam Sweeping for Initial Synchronization in mm-Wave Wireless Networks", IEEE 16th International Workshop on Signal Processing Advances in Wireless Communications (SPAWC), 2015, 276-280.

Kschischang, Frank R.et al., "Factor Graphs and the Sum-Product Algorithm", IEEE Transactions on Information Theory, vol. 47, No. 2, Feb. 2001, 498-519.

* cited by examiner

GRAPH-BASED DETERMINATION OF INITIAL-SYNCHRONIZATION BEAM SCANNING

TECHNICAL FIELD

The presently disclosed techniques and apparatus are generally related to wireless communications networks, and are more particularly related to techniques and apparatus for determining scanning beam patterns to be used by access nodes transmitting synchronization signals in a region, to be used by wireless devices in obtaining initial synchronization to the access nodes for accessing communications services.

BACKGROUND

The millimeter-wave portion of the radio spectrum, e.g., including frequencies in the range of 60 GHz or so, is expected to provide many benefits for fifth-generation (5G) wireless communications systems. The accessible channel bandwidths in the millimeter-wave band are potentially larger than those available to commercial wireless systems operating at lower bands, such as those systems using the current Long-Term Evolution (LTE) radio access technologies developed by the membership of the $3^{rd}$-Generation Partnership Project (3GPP). Further, the smaller radio wavelengths in the millimeter-wave band allow the radio transceivers to have more compact hardware when supporting multiple antennas, due to the fact that the antenna element separation in a multi-antenna scenario is typically proportional to the wavelength.

One implication of this latter advantage of the millimeter-wave band is that a large number of antenna elements can be connected to radio access nodes (hereinafter referred to as simply access nodes, or ANs) while maintaining relatively "regular" sizes, compared to previously deployed nodes. These antenna elements, which may be arranged as arrays of horizontally and/or vertically spaced elements, may be used to form narrow beams, concentrating, for example, all the access node's transmit power in a specific/desired direction. This way, distant wireless devices (commonly called user equipments or UEs in 3GPP specification documents) can be reached without causing high interference to devices other than those specifically targeted by the access nodes.

On the other hand, initial synchronization of UEs in a millimeter-wave wireless network, which is generally the first step taken by UEs when attempting to access the network for services, raises some challenging issues. In this context, a key challenge is ensuring that whenever a new UE tries to join such a network, at least one AN in the vicinity of the UE should be able to provide it with signal quality that is good enough to establish a connection between the AN and the UE. At the same time, however, as little power as possible should be devoted to signals transmitted to the UE, so as to allow for support of many other UEs, to minimize interference to other devices, and to minimize overall power consumption of the network. However, the use of narrow beams for initial synchronization purposes provides good signal quality only to a small fraction of the area to be covered. If a new UE arrives in a poorly-covered area, one consequence of using narrow beams for the transmission of synchronization signals can be that this UE is unable to join the network, since it cannot listen to and decode satisfactorily any synchronization signal from the ANs.

Inactivating antenna elements in the array of antenna elements available to a given access node makes it possible to create wider beam patterns, with the limit being reached by transmission from only a single antenna element. In some possible configurations, however, such as configurations in which there is one power amplifier per antenna element, this may entail a reduction in total conducted power into the array. It is therefore more power-efficient, as a general matter, to use all of the available antenna elements to radiate power.

Assuming the use by each access node in a given region of all the antenna elements available to it, it is therefore desirable to minimize the total consumed power by adjusting the power level of every beam, from every access node, in each transmit-time interval, so that every UE in the region can perform initial synchronization. This leads to a beam-sweep procedure, in which narrow beams, one at each AN, are simultaneously transmitted in contiguous transmit-time intervals, namely beam sweep instances, in order to radiate energy over the area where UEs may appear and try to establish connection, until the whole area is scanned.

To minimize the total consumed power for this initial synchronization process, an optimization problem can be formulated where the objective is to minimize the sum of all the transmit power levels to be used during the beam scan. The objective is subject to a set of quality-of-service (QoS) constraints (e.g., minimum signal-to-interference-plus-noise ratio (SINR) requirements for the reception of synchronization signals by UEs in the region) and a set of transmit power constraints. The result is the feasible power settings, for all transmitted synchronization beams, where the element-wise sum of the power settings is minimized. From the resulting power settings, the beam sweep pattern to be used in the beam scan is derived. Ideally, the transmission of synchronization signals using the resulting power settings provides good signal quality to any new UE in the area that may try to synchronize to an AN.

By its nature, the problem described above is combinatorial, with high computational complexity for large-scale networks. Thus, its optimal solution is difficult to obtain, as the exhaustive search for the optimal solution grows exponentially with the number of QoS constraints. Although the combinatorial problem can be transformed into a mixed-integer linear program to be solved in a more efficient manner, it is still intractable for very-large-scale networks.

One possible low-complexity approach to defining beam-sweeping patterns for the ANS is to choose the beam sweep pattern, i.e., the sequence of beams that ANs follow over beam sweep instances, at random, with no power optimization. This is the approach described in C. N. Barati, S. A. Hosseini, S. Rangan, P. Liu, T. Korakis, and S. S. Panwar, "Directional cell search for millimeter wave cellular systems," in IEEE 15th International Workshop on Signal Processing Advances in Wireless Communications (SPAWC), June 2014]. However, this approach would make ANs transmit synchronization signals to areas where UEs never (or rarely) appear. Thus, unnecessary power is consumed. In addition, UEs may experience high interference levels from the randomly swept beams.

Another approach is to design the beam pattern and optimize the power settings based on historical statistics for UEs, as collected by the wireless network. This is the approach described in I. M. Guerreiro, J. Axnäs, D. Hui, and C. C. Cavalcante, "Power-efficient beam sweeping for initial synchronization in mm-Wave wireless networks," in IEEE $16^{th}$ International Workshop on Signal Processing Advances in Wireless Communications (SPAWC), June 2015. From such a data set, ANs sub-optimally find a power setting sufficient to provide good synchronization signal quality for UEs to synchronize. As a consequence, the beam sweep pattern is derived from power settings, where only directions associated with non-zero power levels are used. However, the specific algorithms detailed in the paper cited above are performed in a centralized manner, and provide solutions far from the optimum.

SUMMARY

According to some of the techniques detailed herein, ANs exchange messages, e.g., via a backhaul, to jointly find both an optimized transmit power setting and an optimized beam sweep pattern for each of the ANs. The messages to be passed define a protocol to be followed by ANs so that a message-passing algorithm is properly performed. The algorithm can be carried out offline in a decentralized manner, and depends on the availability of historical statistics collected by the system. Advantages of some embodiments of the described solutions include that the radio channel is used less often with the optimized beam scan pattern. Energy is also saved, and interference reduced, due to the optimized power setting. According to some of these embodiments, as described further below, messages are calculated locally at ANs based on historical statistics provided to ANs by the system.

An example method, carried out in one or more nodes of a wireless communications system, is for jointly determining beam-sweeping patterns for synchronization signals transmitted in a region by each of a plurality of access nodes in a wireless network, where each access node is connected to a corresponding array of horizontally and/or vertically spaced antenna elements and is configured to sweep a synchronization signal in a node-specific beam sequence, using the corresponding array, where, for each access node, the node-specific beam sequence is defined by a sequence of power levels corresponding to distinct beam angles available to the access node. This example method includes modeling a total power function corresponding to a total power transmitted in the synchronization signals by the plurality of access nodes, for a given period, wherein said modeling of the total power function comprises modeling the total power function as a factor graph having a plurality of check nodes and variable nodes, each of the check nodes corresponding to one of a plurality of emulated virtual wireless devices in the region and each of the variable nodes corresponding to one of the access nodes and to one of the beam angles available to the one of the access nodes. The method further includes emulating the plurality of virtual wireless devices so as to implement quality-of-service constraints on synchronization signals received by the virtual wireless devices, and applying an iterative message-passing algorithm to the modeled total power function, to determine the sequence of power levels for each of the plurality of access nodes, so as to minimize the total power function, subject to one or more iteration-stopping criteria.

Corresponding systems, which may include one or more access nodes configured to carry out, in a distributed manner, the method summarized above, are also described, as are corresponding computer program products. It will be appreciated that the disclosed techniques, apparatus, and systems further include variations of those summarized above, as detailed below and as illustrated in the attached figures.

DETAILED DESCRIPTION

Figure 1:
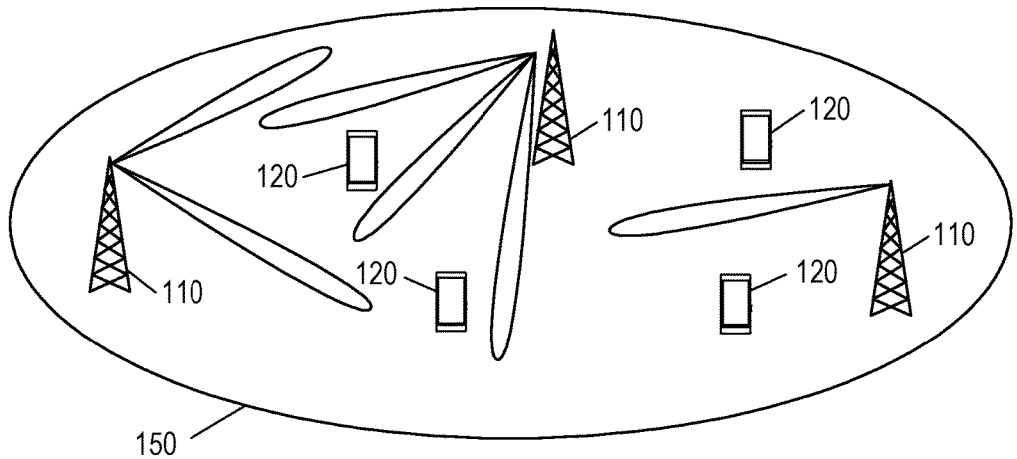
FIG. 1 illustrates an example network scenario in which the present techniques may be applied.

As discussed above, to minimize the total consumed power during initial synchronization, in a system where multiple access nodes are sweeping narrow beams in an area, an optimization problem can be formulated such that the objective is to minimize the sum of all the transmit power levels to be used during the beam scan. As noted above, the objective is subject to a set of QoS constraints and a set of transmit power constraints. The result is the power settings for the swept beams that minimize the total power consumption.

Developing the set of QoS constraints depends on the availability of information characterizing the reception of synchronization signals at various points in the region covered by the swept beams. This information may be derived from a set of historical statistics of users. That is, synchronized UEs report, to the network, some information characterizing the received signal quality during synchronization. Each such report can then be treated as a "virtual UE" that emulates a UE in the optimization problem, with the SINR for each UE being a function of the spatial directions in which the synchronization signals are transmitted.

Based on these virtual UEs, the optimization problem described above can be solved using a decentralized approach in which ANs exchange messages, e.g., via a backhaul, to jointly find both optimized transmit power settings and an optimized beam sweep pattern for each AN. The messages to be passed define a protocol to be followed by ANs, so that a message-passing algorithm can be executed. This message-passing algorithm can be carried out offline, in a decentralized manner, given the availability of historical statistics collected by the system.

Accordingly, the techniques described herein provide a method to compute an allocation of a set of resources to be used by access nodes during initial synchronization of users in a network. An example of this set of resources is a set of power levels, namely power settings, of synchronization signal beams transmitted from ANs to users that may be trying to establish connection to the network. These power settings, which corresponding to particular beam azimuths and elevations, define a beam sweep pattern, where beams associated with non-zero power levels are transmitted following a pre-defined sequence. Another example of an allocation of a set of resources that may be computed according to the procedures generally described herein is to determine the time and/or beam-width for the transmitted synchronization signal beams, instead of the power levels.

This method can be performed in an "offline" manner, that is, before the transmission of synchronization signals according to the calculated configuration. As an example, the system provides a set of historical statistics for wireless devices to the access nodes in a given region. This historical data reflects measurements, link quality information, and the like, as previously reported by wireless devices after synchronization. The type of data reported by the wireless devices comprises the received signal power and transmit beam identification, for example, where the transmit beam identification identifies a specific beam (and thus indicates the source of the beam as well as its specific azimuth and/or elevation). Thus, an AN (or other node analyzing the reported data) can know, for a given beam direction, what the received signal qualities were at the UEs that reported such data. The collected data might be arranged, for example, into a large array whose rows correspond to different beams m and whose columns correspond to different UEs k, with each entry (m, k) being a corresponding received signal quality.

Note that initially, when no such historical user statistics are available to the system, each AN may transmit at full power as it sweeps over all possible beams, while it gradually builds up the collection of historical statistics.

The techniques described herein can also be performed in an "online" manner. As an example, access nodes in operation receive data from users after synchronization and process such data to update their resources and beam pattern in a more or less continuous manner.

In some embodiments, the methods described herein are run periodically. As an example, the set of historical statistics is updated or more data is added by the system, e.g., as more wireless devices establish connection and report data to the system. Then, the allocation of resources, e.g., the power settings for the available synchronization beams, must be updated.

In some embodiments, each run of the method comprises the execution of a decentralized algorithm performed by access nodes in the network. As an example, each access node computes power levels to be used during synchronization signal transmissions, based on the set of historical data and also on information received from neighboring access nodes through a backhaul. This decentralized approach is based on message-passing. As an example, a message-passing algorithm is developed to be applied to the problem of initial synchronization via beam scan. Access nodes exchange messages that convey information indicating how each power level value per beam impacts the total consumed power. The message-passing can be based on the sum-product algorithm, for example, as described in F. R. Kschischang, B. J. Frey, H.-A. Loeliger, "Factor graphs and the sum-product algorithm," in IEEE Transactions on Information Theory, vol. 47, no. 2, February 2001, but is not limited to this particular approach.

Alternatively, the techniques can be run in a centralized manner, while still using a message-passing algorithm. In this case, the messages, detailed examples of which are described below, are "passed" between emulated access nodes, and between the emulated access nodes and emulated virtual wireless devices. As an example of this approach, a central processing unit having network connections to access nodes gathers the set of historical statistics of users, to jointly compute the set of resources to be applied by the access nodes. Then, the computed set of resources is sent to access nodes to be used for the transmissions of the synchronization signal beams.\

System Model

As an example to describe the system model, consider an indoor millimeter-wave scenario where N ANs are arbitrarily placed to provide an adequate coverage to K UEs for initial synchronization. Let N be the set of all the ANs in the network, and let K be the set of virtual UEs available in the historical data observations collected over time. These UE records may denote the received signal power per beam observed and reported by UEs. From those records, relevant areas where UEs are most likely to arrive and request connectivity can be estimated.

In the following, it is assumed each AN is connected to a large number of M×M antenna elements, vertical and horizontally spaced by d, through the use of 2-dimensional uniform planar phased antenna arrays. Moreover, for simplicity, each UE is assumed to be (but is not limited to be) a single-antenna receiver, which ideally receives signals omni-directionally. The use of a massive number of transmit antennas (e.g., 64 antenna elements) at each AN results in a particular beam shape that has a main lobe with narrow beam width and high antenna gain. The direction in which this main lobe is pointed depends on what value the relative phase excitation between adjacent antenna elements takes on. Note that the techniques described here are not limited to these antenna configurations, but can be used for systems where ANs have different numbers of antennas elements, and, for example, where at least some of the antenna arrays may be exclusively horizontal or vertical.

FIG. 1 is a simplified illustration of a region 150 that includes several ANs 110 and several UEs 120. The ANs 110 are illustrated as transmitting narrow-beam synchronization signals; while multiple beams are illustrated, it will be appreciated that each AN 110 may be transmitting only one beam at any given instance. In simple terms, the optimization problem discussed herein involves determining the particular beams to be transmitted by each AN, as well as the power levels associated with those beams, to ensure that all of the UEs 120 receive synchronization signal transmissions that meet their respective QoS constraints, e.g., that provide an appropriate SINR for the synchronization signal as received by each UE 120.

Beam Sweep Code Book

Each of the ANs in the system described above is able to sweep (or scan) its surroundings by varying the azimuth and elevation angles associated with its antenna array. In principle, the azimuth and elevation angles can take on any value in [0 2π], each pair of values defining then a steering vector. The mapping between those angles and the steering vector can be either a continuous or a discrete function. In the discrete case, the sets of azimuth and elevation angles are finite and pre-defined, where each ordered pair of angles defines a beam/direction. Also, all the ANs simultaneously transmit beams, but only one beam per AN is transmitted in a given beam sweep instance. One by one, beams are sequentially transmitted at each AN and eventually the entire relevant area is swept and properly covered.

As an example of a pre-defined discrete set (codebook) of beams, let $\mathcal{L}$ be an index set enumerating the beams available at each AN. That is, $$\mathcal{L} = \{1, 2, \ldots, L\}$$

where L is the number of available beams. Also, let $u_{n,l}$ denote a unit-norm weight vector that represents the (narrow) beam $l \in \mathcal{L}$ transmitted through the M×M transmit antenna elements at AN n. Assuming transmit phased arrays, each weight vector $u_{n,l}$ is then defined as follows:

$$u_{n,l} = \frac{1}{M} \begin{bmatrix} e^{-\frac{j2\pi}{\lambda}(x_{n,1}-x_{n,0})^T a_l} \\ e^{-\frac{j2\pi}{\lambda}(x_{n,2}-x_{n,0})^T a_l} \\ \vdots \\ e^{-\frac{j2\pi}{\lambda}(x_{n,M2}-x_{n,0})^T a_l} \end{bmatrix},$$

where:

$$a_l = [\cos \theta_l \sin \phi_l \sin \theta_l \sin \phi_l \cos \phi_l]^T,$$

and where vectors $x_{n,m}$ and $x_{n,0}$ stand for the column vectors collecting 3-dimensional Cartesian coordinates of antenna element m at AN n and the reference point (i.e., the center point of the antenna array) of AN n, respectively, $\lambda$ denotes the wavelength, and $\theta_l$ and $\phi_l$ are the azimuth and elevation angles that specify the relative phase excitation between antenna elements of AN n.

Furthermore, let $$w_{n,l} = \sqrt{P_{n,l}} u_{n,l}$$

represent the precoding weight (steering) vector where $P_{n,l}$ denotes the transmit power that AN n sets to transmit its beam. Thus, the beam sweep instance l is defined as the transmit-time interval when AN n transmits beam l with power $P_{n,l}$, for all $n \in \mathcal{N}$.

For simplicity, beams are ordered as a linear sequence so that each beam is indexed by the index m. Thus, the ordered pair (n, l), which refers to the AN $n \in \mathcal{N}$ and its beam $l \in \mathcal{L}$, is mapped as (n, l)→m, so that $$m = L(n-1) + l,$$

and, reversely, for m=1, ..., NL, $$n = \left\lceil \frac{m}{L} \right\rceil,$$

$$l = \mathrm{mod}\,[m-1, L] + 1,$$

where $\lceil \cdot \rceil$ and mod [•,•] stand for the ceiling function and the modulo operation, respectively. Then, a total of NL beams makes up the set $$\mathcal{M} = \{1, 2, \ldots, NL\}.$$

Note that this approach eases the representation of beams through their associated power levels in a factor graph. Accordingly, each power level $P_{n,l}$ can be mapped into $P_m$. The same is applied to weight vectors, i.e., each $u_{n,l}$ is mapped into $u_m$ and each $w_{n,l}$ is mapped into $w_m$. Eventually, when a UE is assigned to a beam indexed by m, it can easily map m back into (n, l).

Neighborhood Definition and Performance Metric

For each virtual UE k, let $\mathcal{A}_k$ be an index set of beams that virtual UE k is capable of listening to during synchronization and reporting data for. For each beam m, let $\mathcal{B}_m$ be an index set of virtual UEs that the system is capable of receiving data from, regarding beam m as transmitted from its associated AN.

For each beam m, an individual power level $P_m$, subject to a maximum power constraint, i.e. $P_{max}$, is calculated, so that there exists at least one precoding weight vector $w_m$ that provides good synchronization signal quality for all the virtual UEs in $\mathcal{K}$. Let $G_{m,k}$ denote the equivalent channel gain between virtual UE k and AN transmitting beam m. The SINR observed by virtual UE k listening to beam m is then defined as $$\Gamma_{m,k} = \frac{P_m G_{m,k}}{\sum_{m' \in \mathcal{M}_{m,k}} P_{m'} G_{m',k} + \sigma_k^2},$$

where $\mathcal{M}$ is the set of beams that interfere beam m at virtual UE k, defined as $$\mathcal{M} = \{m' \in \mathcal{A}_k \mid \mathrm{mod}\,[|m'-m|, L] = 0, m' \neq m\}.$$

The interfering beams of beam m are those that are transmitted in the same beam sweep instance by neighboring ANs.

To deal with the SINR constraints, an indicator function $1_k$ is defined as $$1_k[\Gamma_{m,k} \geq \gamma] = \begin{cases} 0 & \exists\, m,\, \Gamma_{m,k} \geq \gamma, \\ +\infty & \text{otherwise} \end{cases},$$

where $\gamma$ is a SINR threshold above which every $\Gamma_{m,k}$ must be, for successful synchronization and robust decoding of synchronization signals. The indicator function penalizes any infeasible power setting by returning $+\infty$ (or other very large value).

A power consumption model function $\Psi_m$ is introduced to account for the relation between the transmit power and the consumed power at each AN. In general, it can have any shape to take into account nonlinearities and power dissipation, but it can be simply a linear relation as $$\Psi_m(P_m) = P_m,$$

which means that the power consumption depends only on the transmit power.

Another aspect is the fact that some a priori information ANs may obtain from the historical statistics can be incorporated into each $\Psi_m$. As an example, virtual UEs may inform the system the power levels that ANs should transmit with in order to satisfy every SINR constraint. Let $\overline{P}_{m,k}$ denote the minimum power level that beam m should be transmitted with in order to satisfy the SINR constraint of virtual UE k, defined as $$\overline{P}_{m,k} = \frac{\gamma}{G_{m,k}} \left( \sum_{j \in \mathcal{M}_{m,k}} P_j G_{j,k} + \sigma_k^2 \right), \forall\, m \in \mathcal{M},\, k \in \mathcal{B}_m.$$

Note that each $\overline{P}_{m,k}$ depends on its set of interfering beams $\mathcal{M}$. If such information is taken into account, then the search space of the best power setting becomes a function of every $\overline{P}_{m,k}$. In other words, ANs do not have any incentive to transmit a beam with any power different from the minimum power levels $\overline{P}_{m,k}$. Consequently, each function $\Psi_m$ looks like a sum of step functions, each step being a function of an individual minimum power level.

Optimization Problem Formulation:

The total consumed power function $f$ in the network is formulated as an objective along with a penalty factor represented by the indicator function, as follows:

$$f(\{P_m\}_{m \in \mathcal{M}}) = \sum_{m \in \mathcal{M}} \Psi_m + \sum_{k \in \mathcal{K}} 1_k[\Gamma_{m,k} \geq \gamma].$$

$$= \sum_{k \in \mathcal{K}} \sum_{j \in \mathcal{A}_k} \omega_{j,k} \Psi_j + \sum_{k \in \mathcal{K}} 1_k [\Gamma_{m,k} \geq \gamma]$$

$$= \sum_{k \in \mathcal{K}} \left( \sum_{j \in \mathcal{A}_k} \omega_{j,k} \Psi_j + 1_k [\Gamma_{m,k} \geq \gamma] \right),$$

where $\omega_{j,k}$ denotes a weight to avoid double counting of variables, and is defined so that $$\sum_{k \in \mathcal{K}} \omega_{j,k} = 1, \forall j \in \mathcal{M}.$$

Note that $f$ factorizes into a sum of K terms (factors), and each set $\mathcal{A}_k$ determines the interdependency of these factors. Note that the set of historical statistics is assumed to be rich enough so that every beam in $\mathcal{M}$ has at least one UE in $\mathcal{K}$ that can listen to it. Alternatively, the set $\mathcal{M}$ can be replaced with some set $\mathcal{M}'$ defined as the finite union of sets $\mathcal{A}_k$, for all $k \in \mathcal{K}$.

Finally, the problem of minimizing the total consumed power in the network can then be stated as $$\min_{\{P_m \in [0, P_{max}]\}_{m \in \mathcal{M}}} \sum_{k \in \mathcal{K}} \left( \sum_{j \in \mathcal{A}_k} \omega_{j,k} \Psi_j(P_j) + 1_k [\Gamma_{m,k} \geq \gamma] \right).$$

General Graph-based Framework

Due to the structure of the equation above, a message-passing algorithm framework, such as the framework of the min-sum algorithm, can be applied to find the power setting that minimizes the total consumed power in the network. Note that while the use of the min-sum algorithm is described herein, the optimization problem described above may be formulated in different but substantially equivalent ways, such that other algorithms, such as the max-sum algorithm (e.g., where the negative of the total power function is optimized) or min-product algorithm (e.g., where the total power function is in the log domain) may be used, instead of the min-sum algorithm. It will be appreciated that the basic approach described here will apply to any of these alternate formulations of the optimization problem.

Figure 2:
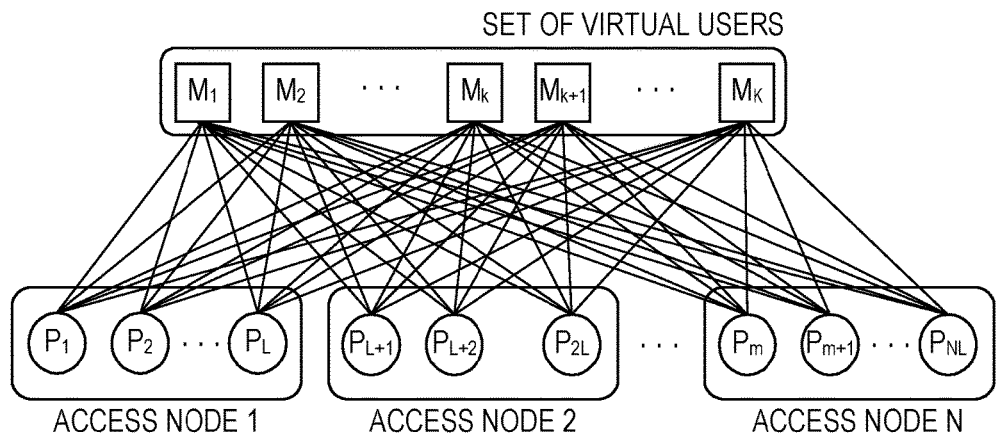
FIG. 2 illustrates an example of a factor graph with check nodes and variable nodes, where the check nodes and variable nodes are mapped to virtual users (wireless devices) and access nodes, respectively.

The total consumed power function $f$ described above can be graphically modeled by a bipartite graph, namely a factor graph, with check nodes and variable nodes. Each check node according to this approach represents a virtual UE, while each variable node represents a beam. More precisely, each variable node corresponds to a particular beam direction, at a particular node, where the transmit power level for the beam is the "variable." The check nodes act as entities that check whether the SINR constraints of the virtual UEs are satisfied, while the variable nodes act to establish the transmit power levels of their respective beams. FIG. 2 shows an example of factor graph modeling a network with L beams per AN, with a total of N ANs and K virtual UEs, which means that there are NL variable nodes and K check nodes. In FIG. 2, check nodes are represented as squares and variable nodes as circles. Each access node has L beams and there are N access nodes in the network. A virtual user, represented by check node $M_k$, corresponds to a user that synchronized and reported data to the system previously. In addition, each variable node represents a beam, where the power level for the beam is the modeled variable. Check nodes and variable nodes are connected through edges. If a variable node is connected to a check node, it means that the underlying virtual user can detect and decode the synchronization signal from that beam, at some level. The task of the optimization problem is to determine the minimum non-zero power level that should be used by the access node to transmit that beam so that the virtual user (which emulates an actual device) can detect and decode the transmitted synchronization signal. This minimum non-zero power level is the power level that satisfies the quality-of-service constraint for the virtual user—this may be a constraint that the SINR for the received synchronization level is greater than a threshold $\gamma$, for example.

Now, let $\alpha_{k \to m}$, referred to herein as a "summary message," denote the message to be passed from check node k to variable node m, and let $\beta_{m \to k}$, referred to herein as an "aggregate message," denote the normalized message to be passed from variable node m to check node k. The min-sum algorithm simply iterates between the following two kinds of message computation and exchanges:

Summary message, from check node to variable node:

$$\alpha_{k \to m}(P_m) = \min_{\{P_i\}_{i \in \mathcal{A}_k \setminus \{m\}}} \left\{ 1_k [\Gamma_{m,k} \geq \gamma] + \sum_{j \in \mathcal{A}_k \setminus \{m\}} \beta_{j \to k}(P_j) \right\},$$

where the minimization is performed over all the neighboring variable nodes except for the destination. Thus, each summary message is a univariate function of $P_m$.

Note that $\Gamma_{m,k}$ also depends on $P_m$.

Aggregate message, from variable node to check node:

$$\beta_{m \to k}(P_m) = \Psi_m(P_m) + \sum_{j \in \mathcal{B}_k \setminus \{k\}} \alpha_{j \to m}(P_m) - \left( \min_{P_m} \sum_{j \in \mathcal{B}_m \setminus \{k\}} \alpha_{j \to m}(P_m) \right),$$

where the sum is performed over all the neighboring check nodes except for the destination. The third term on right-hand side of the equation above is a normalizing factor to prevent messages from increasing endlessly.

Figure 3:
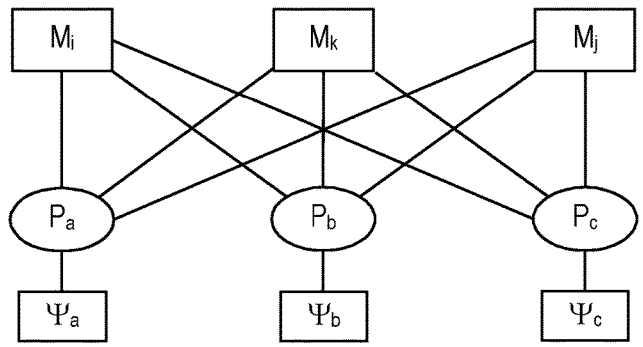
FIG. 3 illustrates an example of a fully-connected factor graph with three check nodes and three variable nodes.

Note that the expression of aggregate message computation above contains explicitly the function $\Psi_m$ as an additive term, which depends only on $P_m$. Thus, alternatively, a factor node can be introduced and attached to each variable node to represent each function $\Psi_m$. In this case, each additive term $\Psi_m$ is in turn moved from the aggregate message expression to each new factor node as a factor. Consequently, the resulting factor graph would contain both factor and check nodes, along with the variable nodes, as shown in FIG. 3, which shows an example of a fully-connected factor graph with three check nodes, three factor nodes, and three variable nodes. Every check node is connected to all the variable nodes, which means that, in this example, every virtual UE heard all the beams used in the network. In contrast, each factor node is connected only to its associated variable node. Each factor node's role is to pass its factor to its associated variable node.

Granular Message-passing: A Low-complexity Approach

The computational complexity to compute the summary messages and the individual minimum power levels, as described above, is still high. Each check node must hypothesize every combination of interfering terms.

To decrease complexity, the interference terms can be neglected, since narrow beams can be assumed to cause very low interference to one another, and since the SINR threshold γ is usually small (e.g., −10 dB) for robust decoding and detection.

Also, note that in general, a user does not need to be served by more than one beam. Thus, a message from a virtual UE k to a beam m can be defined as a piecewise function. A threshold is then defined as the minimum power level needed for that beam m to serve virtual UE k, i.e., $\overline{P}_{m,k}$. Above such a threshold, the power of the other neighboring beams can be hypothesized so that they consume as little power as possible. Otherwise, virtual UE k hypothesizes the minimum power consumed by the other beams if at most one of them would serve.

More specifically, summary messages are redefined, according to this low-complexity approach, by disregarding interference terms, as $$\alpha_{k \to m}(P_m) = \begin{cases} 0 & \text{if } P_m \geq \overline{P}_{m,k}, \\ \min_{j \in \mathcal{A}_k \setminus \{m\}} \left( \min_{P_j \geq P_{j,k}} \beta_{j \to k}(P_j) \right) & \text{otherwise}, \end{cases}$$

where $$\overline{P}_{m,k} = \frac{\gamma \sigma_k^2}{G_{m,k}}, \forall m \in \mathcal{M}, k \in \mathcal{B}_m.$$

Note that the minimum power levels are constant, due to the neglecting of interference. In addition, recall that aggregate messages are normalized, i.e., their minimum values equal zero.

The expressions above can be understood as answering the question that check node k needs to resolve, which is: "which neighboring beam can satisfy me with minimum power consumption?" The check node tries to express the best answer, per neighboring variable node, through the computation and delivery of summary messages. Thus, for a given summary message, say $\alpha_{k \to m}(P_m)$, check node k determines that beam m can satisfy it with beam powers $P_m$ that fall within $\overline{P}_{m,k} \leq P_m \leq P_{max}$. For this range of beam powers, the summary message for beam m returns a value of 0. Note that from the sum of all the most recently received aggregate messages other than the one from the targeted variable node m, the minimum power consumed is zero because every aggregate message is normalized. For beam powers in the range $P_m \leq \overline{P}_{m,k}$, however, beam m cannot satisfy the check node's QoS constraint. In this range, some other neighboring beam must satisfy it. To find the beam $j \in \mathcal{A}_k \setminus \{m\}$ that satisfy it with minimum power consumption, check node k calculates the minimum values of every message $\beta_{j \to k}(P_j)$ within $\overline{P}_{j,k} \leq P_j \leq P_{max}$ (the inner minimization in the expression above) and choose the minimum among these minimum values (the outer minimization). Check node k is then effectively saying to variable node m that "for the range $P_m < \overline{P}_{m,k}$, you cannot satisfy me. So, another beam will satisfy my QoS constraints, and this is the resulting power to be consumed."

The expression of summary messages above has a low computational complexity. Each check node k has to do only a small number of checks to compute its summary messages. Furthermore, for binary power levels, all summary and aggregate messages can be single-step, independently of the number of virtual UEs, which decreases even more the complexity of message computation.

Message-passing Algorithm

Figure 4:
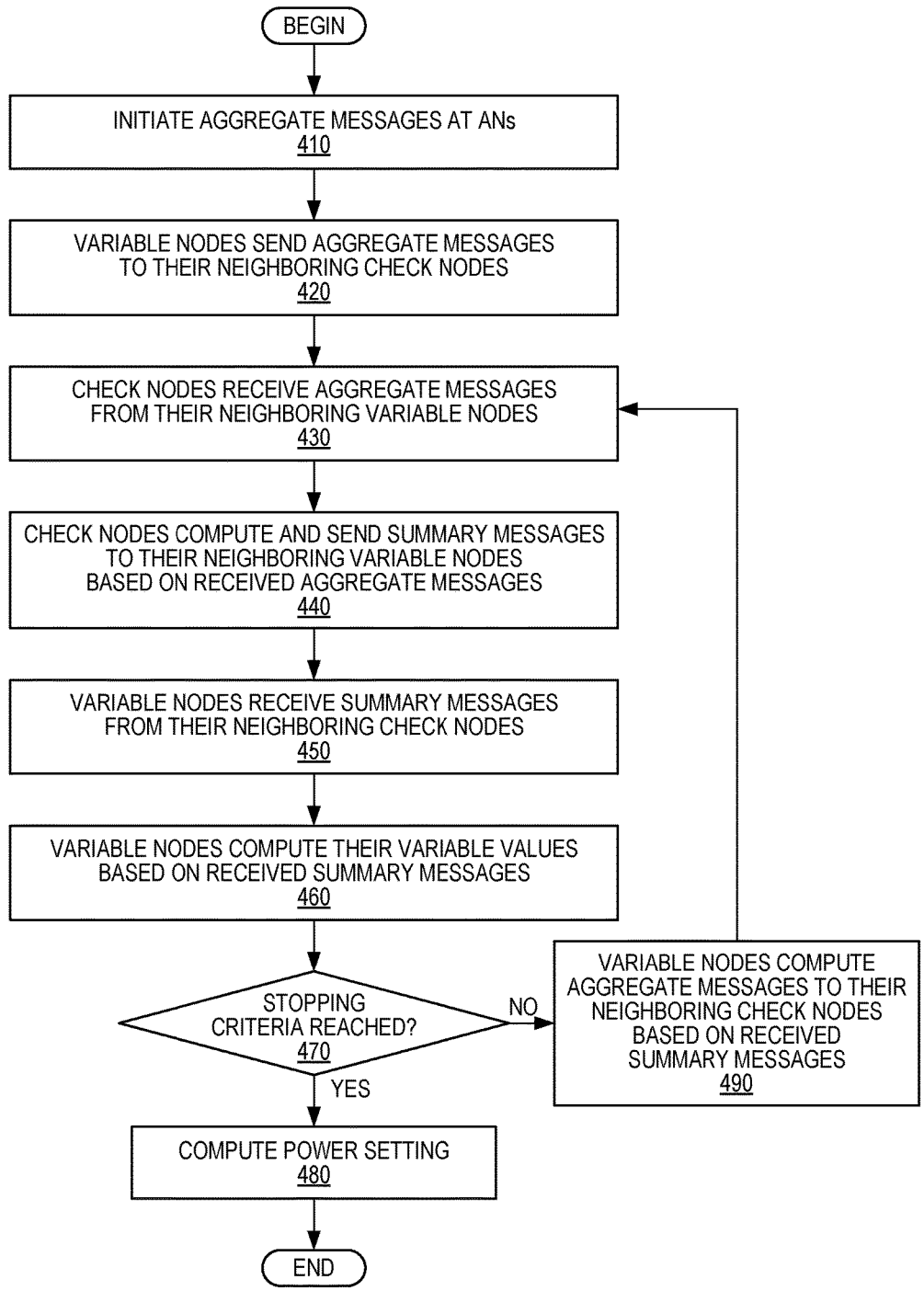
FIG. 4 is a process flow diagram illustrating an example method according to some embodiments of the presently disclosed techniques.

FIG. 4 is a flowchart illustrating the steps of a message-passing algorithm. The message-passing algorithm begins, whether or not the low-complexity approach described above is used, with variable node m computing outgoing aggregate message $\beta_{m \to k}$ to check node k, for $k \in \mathcal{B}_m$, $\forall m \in \mathcal{M}$, with an initialization of all the incoming summary messages from neighboring check nodes to zero. That is, the initially computed aggregate messages simply equal their respective power consumption model functions. This is shown at block 410. As shown at block 420, the initially computed aggregate messages are sent by the variable nodes to their connected check nodes.

Upon receipt of the aggregate messages, as shown at block 430, each check node k computes outgoing summary message $\alpha_{k \to m}$ to variable node m, for $m \in \mathcal{A}_k$, $\forall k \in \mathcal{K}$, and the computed summary messages are then sent to variable nodes, as shown at block 440. This back-and-forth message exchange defines an iteration of the message passing algorithm. At the end of a message-passing iteration, e.g., after receiving the summary messages from its connected check nodes, as shown at block 450, each variable node can compute its corresponding univariate function and then determine its power level that minimizes it by $$P_m^* = \underset{P_m}{\arg\min} \left\{ \Psi_m(P_m) + \sum_{j \in \mathcal{B}_m} \alpha_{j \to m}(P_m) \right\}, m \in \mathcal{M}.$$

This computation is shown at block 460. The algorithm then iterates until a stopping criterion is reached, as indicated at block 470, after which the final power settings for each access node are computed, as shown at block 480 This criterion may be for example, a predetermined maximum number of iterations, or when the power settings computed at the end of each iteration converge to a fixed state.

If the stopping criterion is not reached, as indicated by the "no" arrow leaving block 470, the variable computes aggregate messages again, as shown at block 490, based on the most recent summary messages, and the iteration continues, as shown in the figure.

Emulation of Virtual UEs and Message Exchange Among ANs

Virtual UEs are emulated by ANs to act as users in the system with QoS constraints to be satisfied during initial synchronization. A given virtual UE must then be emulated by at least one AN, e.g., one of the ANs for which that virtual UE reported data.

The set $\mathcal{K}$ of virtual UEs can be split into subsets $\mathcal{K}$ so that $\mathcal{K} = \cup_{n \in \mathcal{N}} K_n$. Then, for every $n \in \mathcal{N}$, virtual UEs that belong to subset $K_n$ are emulated by AN n. The subsets $K_n$ can be disjoint, which means that every virtual UE is emulated by no more than one AN. However, different virtual UEs can still be emulated by different ANs. In this case, check nodes in the factor graph in FIG. 2 are allocated to the ANs to form the subsets $K_n$ at each AN. For example, each virtual UE can be emulated by the AN with the lowest path loss to itself. If a check node is connected to variable nodes at different ANs, summary messages are then exchanged among those ANs, which makes the message exchange among ANs comprise both summary and aggregate messages.

Figure 5:
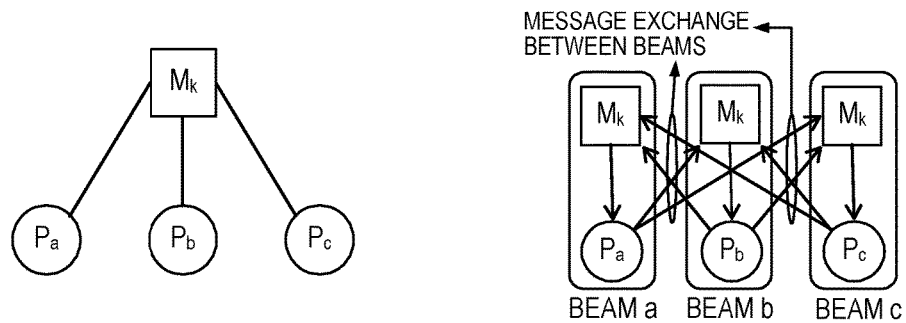
FIG. 5 illustrates a regular factor graph with undirected edges and an equivalent factor graph with node replication.

Alternatively, each check node k may be replicated at all of its neighboring variable nodes in $A_k$. Due to node replication, arrowless undirected (or bi-directed) edges in the graph are replaced with (uni-) directed edges with arrows. The arrow of a directed edge indicates the direction in which messages along that edge are passed. FIG. 5 illustrates a regular factor graph, on the left-hand side of the figure, as well as its equivalent version with replicated check nodes, on the right-hand side. In the illustration on the right-hand side, undirected edges are replaced with directed edges whose arrows indicate the directions messages are passed in. The regular factor graph on the left-hand side of FIG. 5 is then equivalent to the factor graph with replicated nodes on the right-hand side. However, in the illustration on the right-hand side of FIG. 5, each pair of variable node and replicated check node in a curved dashed rectangle represents a beam in a given AN. Note that only aggregate messages are passed among beams.

Now suppose that variable nodes are connected to multiple check nodes. For example, in a fully-connected factor graph with three check nodes and three variable nodes, every check node is connected to all the variable nodes, as was shown in FIG. 3. Then, each AN emulates the virtual UEs needed for its beams to pass messages also by using node replication. Consequently, an equivalent factor graph with replicated check nodes can be found.

Figure 6:
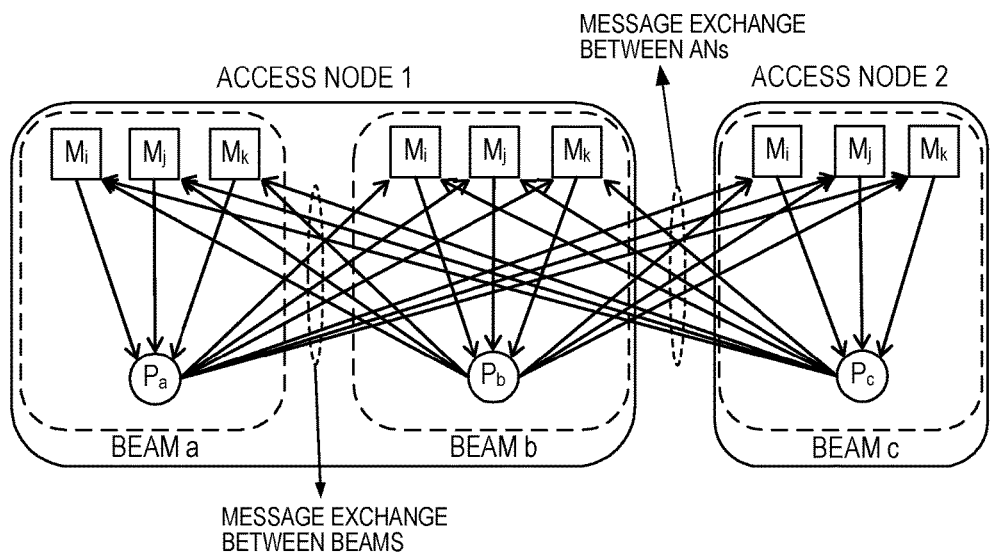
FIG. 6 illustrates an equivalent factor graph of the fully-connected factor graph example in FIG. 3.

FIG. 6 illustrates the equivalent factor graph of the fully-connected factor graph example of FIG. 3. Each curved rectangle represents an access node. In this example, access node 1 has beams a and b, while access node 2 has beam c. The check nodes inside an access node denote the emulation of the virtual UEs the beams of that access node were heard by. Note that the message exchange between beams of the same access node is performed locally, whereas the message exchange among beams of different access nodes takes place over some backhaul.

Message passing from variable nodes to check nodes within the same AN are passed locally, which in principle does not cause any impact on the signaling load over some backhaul that interconnects ANs. On the other hand, messages from variable nodes to check nodes belonging to different access nodes are sent over the backhaul. Summary message computation associated with a given check node must be parallelized over ANs related to neighboring variable nodes of that check node. That is because each of these ANs has a replica of that check node.

Figure 7:
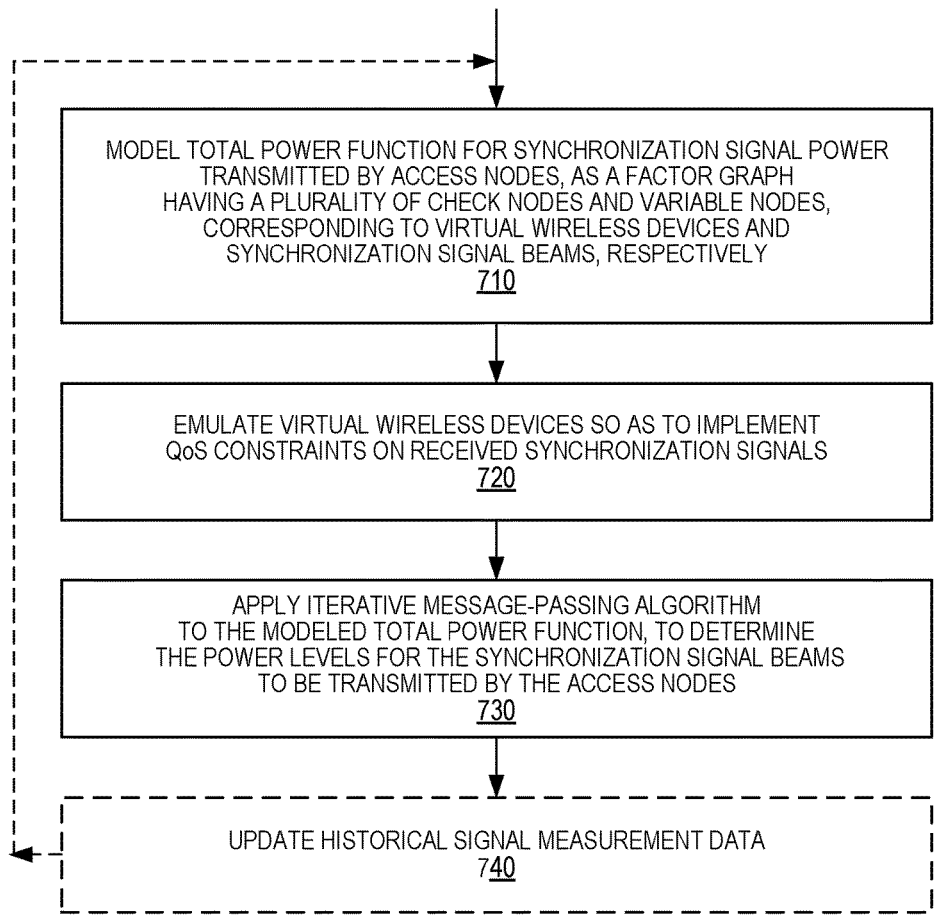
FIG. 7 is a process flow diagram illustrating an example method according to some embodiments of the presently disclosed techniques.

With the above detailed explanation in mind, it will be appreciated that FIG. 7 illustrates a generalized method of jointly determining beam-sweeping patterns for synchronization signals transmitted in a region by each of a plurality of access nodes in a wireless network, wherein each access node is connected to a corresponding array of horizontally and/or vertically spaced antenna elements and is configured to sweep a synchronization signal in a node-specific beam sequence, using the corresponding array. For each access node, the node-specific beam sequence is defined by a sequence of power levels corresponding to distinct beam angles available to the access node. Note that when the array comprises both horizontally and vertically spaced elements, each available beam angle corresponds to a specific combination of azimuth and elevation; in embodiments where only horizontal elements are used, on the other hand, each available beam angle may be represented by only a distinct azimuth. The method may be implemented in a distributed manner, by the access nodes, in some embodiments, and in a centralized manner, e.g., by a control node or by some other node, in others.

As shown at block 710, the illustrated method comprises modeling a total power function corresponding to a total power transmitted in the synchronization signals by the plurality of access nodes, for a given period. This modeling of the total power function comprises modeling the total power function as a factor graph having a plurality of check nodes and variable nodes, each of the check nodes corresponding to one of a plurality of emulated virtual wireless devices in the region and each of the variable nodes corresponding to one of the access nodes and to one of the beam angles available to the one of the access nodes.

As shown at block 720, the illustrated method further comprises emulating the plurality of virtual wireless devices so as to implement quality-of-service constraints on synchronization signals received by the virtual wireless devices. Further, as shown at block 730, the method comprises applying an iterative message-passing algorithm to the modeled total power function, to determine the sequence of power levels for each of the plurality of access nodes, so as to minimize the total power function, subject to one or more iteration-stopping criteria. In some embodiments of the illustrated method, synchronization signals are transmitted from one or more of the access nodes, applying the determined sequences of non-zero power levels for the access node.

In some embodiments of the illustrated method, the iterative message-passing algorithm is a min-sum algorithm, as detailed above. In other embodiments, the iterative message-passing algorithm may be a max-sum algorithm or a min-product algorithm, for example.

In some embodiments, the emulating of the plurality of virtual wireless devices is based on historical signal measurement data from wireless devices in the region, the historical signal measurement data comprising received signal strength data for synchronization signals transmitted by the plurality of access nodes. In some of these embodiments, at least a portion of the historical signal measurement data corresponds to measurements made from full power sweeps of the synchronization by one or more of the access nodes.

In some embodiments, the method further comprises, subsequent to the modeling, emulating, and applying shown in blocks 710-730, updating the historical signal measurement data, using signal strength data from wireless devices for synchronization signals transmitted by the plurality of access nodes using the determined sequences of non-zero power levels. This is shown at block 740, which is shown with a dashed outline to indicate that it need not appear in every embodiment or instance of the illustrated method. After this updating, the modeling, emulating, and applying of blocks 710-730 are repeated to obtain updated sequences of non-zero power levels for one or more of the access nodes.

In some embodiments, applying the iterative message-passing algorithm to the modeled total power function includes generating, for each variable node, an initial aggregate message targeted to each check node that corresponds to a virtual wireless device that, based on historical signal quality data, is deemed able to receive a synchronization signal transmitted by the access node corresponding to the variable node at the combination of azimuth and elevation beam angles corresponding to the variable node, each of the initial aggregate messages consisting of a variable node power function that is a function of transmitted power levels for the variable node. This was shown at block 410 of FIG. 4. The initial aggregate messages are then passed to the respective check nodes, as shown at block 420 of FIG. 4.

As was illustrated at block 440, each check node then computes a summary message targeted to each of a set of variable nodes that, based on historical signal quality data, correspond to beams that can be received by the check node, each summary message being a function of transmit power levels for the targeted variable node and having a value, for each transmit power of the targeted variable node, computed as the minimum, over all transmit power levels for all neighboring variable nodes except the targeted variable node, of the sum of (i) an indicator function for the check node and (ii) the aggregate messages most recently received by the check node from all the variable nodes in the set other than the targeted variable node, where the indicator function for the check node is a function of the transmit power level for the targeted variable node and provides a zero for a given transmit power level for the targeted variable node if the signal quality for any of the beams that can be received by the check node, based on the transmit power level for the targeted variable node and transmit power levels for the neighboring variable nodes other than the target variable nodes, exceeds a predetermined threshold, and provides a predetermined penalty value otherwise. The summary messages are then passed to the respective variable nodes. The signal qualities are determined/hypothesized from the historical statistics, combined with every possible power setting. The "feasible region/search space" is then determined by the indicator function, which penalizes those power settings that do not lead to signal qualities above the SINR threshold. To this end, at each check node, every possible SINR value observed by that check node must be hypothesized. "Beliefs" regarding the most recently determined power levels for the neighboring variable nodes are conveyed by aggregate messages. The sum of incoming aggregate messages at a given check node defines a multi-variate belief. To compute summary messages, a given check node then evaluates the most recently determined multi-variate belief at every "feasible" power setting, that is, the power settings that belong to the feasible region.

Next, a transmitted power level that minimizes the sum of the summary messages most recently passed to the variable node is computed by each variable node—this was shown at block 460 of FIG. 4. Each variable node then computes an updated aggregate message targeted to each of the check nodes that corresponds to a virtual wireless device that, based on historical signal quality data, is deemed able to receive a synchronization signal transmitted by the access node corresponding to the variable node at the combination of azimuth and elevation beam angles corresponding to the variable node, each of the updated aggregate messages being computed as a sum of (iii) a power term that is a function of transmitted power levels for the variable node and (iv) a sum of the summary messages most recently passed to the variable node from check nodes other than the targeted check node, less (v) the minimum of all the summary messages most recently passed to the variable node from check nodes other than the targeted check node. The updated aggregated messages are then passed to the respective check nodes. The computing of the summary messages, the passing of the summary messages, the computing of the updated aggregated messages, and the passing of the updated messages, as was illustrated in FIG. 4, until an iteration-stopping criterion is reached. The transmitted power levels for the variable nodes determined just prior to the iteration-stopping criterion represent the determined non-zero power levels for the beam sequences for the plurality of access nodes.

It will be appreciated that embodiments of the presently disclosed techniques include a system for jointly determining beam-sweeping patterns for synchronization signals transmitted in a region by each of a plurality of access nodes in a wireless network, e.g., according to the methods illustrated in FIGS. 4 and 7, as described above, and in variations thereof. Other embodiments include computer program products that include computer program instructions, for execution by one or more nodes in a wireless network, for carrying out one or more of such methods.

Figure 8:
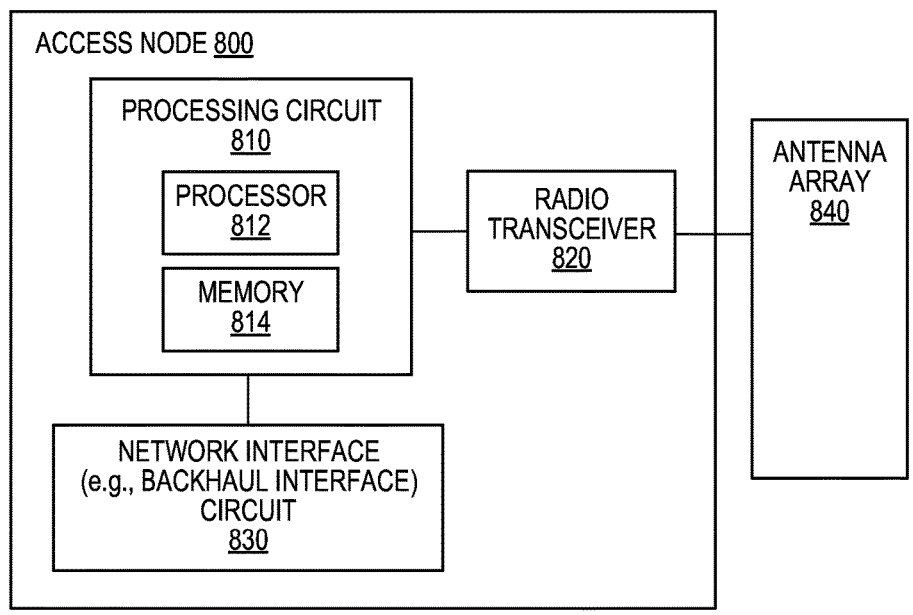
FIG. 8 is a block diagram illustrating an example access node.

FIG. 8 illustrates an example access node 800 in which all or parts of the techniques described above may be implemented. The example access node 810, which is connected to an antenna array 840, comprises a processing circuit 810, a radio transceiver 820, and a network interface circuit 830. The radio transceiver 820, which is connected to the antenna array 840, is configured to receive signals from and transmit signals to wireless devices, including synchronization signals as discussed herein. Processing circuit 810, which in the illustrated example includes a processor 812 and a memory circuit 814, is configured, e.g., using program code stored in memory 814 for execution by processor 812, to control the radio transceiver 820 and the network interface circuit 830, as well as to carry out all or parts of the various methods described herein, including, for example, the methods illustrated in FIGS. 4 and 7 and described above.

What is claimed is:

1. A method, in one or more nodes of a wireless communications system, of jointly determining beam-sweeping patterns for synchronization signals transmitted in a region by each of a plurality of access nodes in a wireless network, wherein each access node is connected to a corresponding array of horizontally and/or vertically spaced antenna elements and is configured to sweep a synchronization signal in a node-specific beam sequence, using the corresponding array, where, for each access node, the node-specific beam sequence is defined by a sequence of power levels corresponding to distinct beam angles available to the access node, the method comprising:
 modeling a total power function corresponding to a total power transmitted in the synchronization signals by the plurality of access nodes, for a given period, wherein said modeling of the total power function comprises modeling the total power function as a factor graph having a plurality of check nodes and variable nodes, each of the check nodes corresponding to one of a plurality of emulated virtual wireless devices in the region and each of the variable nodes corresponding to one of the access nodes and to one of the beam angles available to the one of the access nodes;
 emulating the plurality of virtual wireless devices so as to implement quality-of-service constraints on synchronization signals received by the virtual wireless devices;
 applying an iterative message-passing algorithm to the modeled total power function, to determine the sequence of power levels for each of the plurality of access nodes, so as to minimize the total power function, subject to one or more iteration-stopping criteria.

2. The method of claim 1, wherein the iterative message-passing algorithm is one of a min-sum algorithm, a max-sum algorithm, and a min-product algorithm.

3. The method of claim 1, further comprising transmitting the synchronization signal from one of the access nodes, applying the determined sequences of non-zero power levels for the access node.

4. The method of claim 1, wherein the emulating of the plurality of virtual wireless devices is based on historical signal measurement data from wireless devices in the region, the historical signal measurement data comprising received signal strength data for synchronization signals transmitted by the plurality of access nodes.

5. The method of claim 4, wherein at least a portion of the historical signal measurement data corresponds to measurements made from full power sweeps of the synchronization by one or more of the access nodes.

6. The method of claim 4, wherein the method further comprises, subsequent to said modeling, emulating, and applying:
- updating the historical signal measurement data, using signal strength data from wireless devices for synchronization signals transmitted by the plurality of access nodes using the determined sequences of non-zero power levels; and
- repeating said modeling, emulating, and applying to obtain updated sequences of non-zero power levels for one or more of the access nodes.

7. The method of claim 1, wherein said applying the iterative message-passing algorithm to the modeled total power function comprises:
- generating, for each variable node, an initial aggregate message targeted to each check node that corresponds to a virtual wireless device that, based on historical signal quality data, is deemed able to receive a synchronization signal transmitted by the access node corresponding to the variable node at the combination of azimuth and elevation beam angles corresponding to the variable node, each of the initial aggregate messages consisting of a variable node power function that is a function of transmit power levels for the variable node;
- passing the initial aggregate messages to the respective check nodes;
- computing, for each check node, a summary message targeted to each of a set of variable nodes that, based on historical signal quality data, correspond to beams that can be received by the check node, each summary message being a function of transmit power levels for the targeted variable node and having a value, for each transmit power of the targeted variable node, computed as the minimum, over all transmit power levels for all neighboring variable nodes except the targeted variable node, of the sum of (i) an indicator function for the check node and (ii) the aggregate messages most recently received by the check node from all the variable nodes in the set other than the targeted variable node, wherein the indicator function for the check node is a function of the transmit power level for the targeted variable node and provides a zero for a given transmit power level for the targeted variable node if the signal quality for any of the beams that can be received by the check node, as hypothesized based on the transmit power level for the targeted variable node and transmit power levels for the neighboring variable nodes other than the target variable nodes, exceeds a predetermined threshold, and provides a predetermined penalty value otherwise;
- passing the summary messages to the respective variable nodes;
- determining, for each variable node, a transmit power level that minimizes the sum of the summary messages most recently passed to the variable node;
- computing, for each variable node, an updated aggregate message targeted to each of the check nodes that corresponds to a virtual wireless device that, based on historical signal quality data, is deemed able to receive a synchronization signal transmitted by the access node corresponding to the variable node at the combination of azimuth and elevation beam angles corresponding to the variable node, each of the updated aggregate messages being computed as a sum of (iii) a power term that is a function of transmit power levels for the variable node and (iv) a sum of the summary messages most recently passed to the variable node from check nodes other than the targeted check node, less (v) the minimum of all the summary messages most recently passed to the variable node from check nodes other than the targeted check node;
- passing the updated aggregated messages to the respective check nodes;
- repeating the computing of the summary messages, the passing of the summary messages, the computing of the updated aggregated messages, and the passing of the updated messages, until an iteration-stopping criterion is reached; and wherein the transmit power levels for the variable nodes determined just prior to the iteration-stopping criterion represent the determined non-zero power levels for the beam sequences for the plurality of access nodes.

8. The method of claim 1, wherein emulating the plurality of virtual wireless devices so as to implement quality-of-service constraints on synchronization signals received by the virtual wireless devices is carried out so as to ignore interference.

9. The method of claim 8, wherein said applying the iterative message-passing algorithm to the modeled total power function comprises:
- generating, for each variable node, an initial aggregate message targeted to each check node that corresponds to a virtual wireless device that, based on historical signal quality data, is deemed able to receive a synchronization signal transmitted by the access node corresponding to the variable node at the combination of azimuth and elevation beam angles corresponding to the variable node, each of the initial aggregate messages consisting of a variable node power function that is a function of transmit power levels for the variable node;
- passing the initial aggregate messages to the respective check nodes;
- computing, for each check node, a summary message targeted to each of a set of variable nodes that, based on historical signal quality data, correspond to beams that can be received by the check node, each summary message being computed as (i) a zero if the beam power for the variable node exceeds a minimum power level needed for the corresponding beam to serve the virtual node corresponding to the check node and, otherwise, (b) as the minimum, over all the aggregate messages most recently received by the check node from all the variable nodes in the set other than the targeted variable node, of the values of the aggregate messages in ranges of the aggregate messages in which the transmit power of the corresponding variable node exceeds a minimum power level needed for the corresponding variable node to serve the virtual node corresponding to the check node;
- passing the summary messages to the respective variable nodes;
- determining, for each variable node, a transmit power level that minimizes the sum of the summary messages most recently passed to the variable node;
- computing, for each variable node, an updated aggregate message targeted to each of the check nodes that corresponds to a virtual wireless device that, based on historical signal quality data, is deemed able to receive a synchronization signal transmitted by the access node corresponding to the variable node at the combination of azimuth and elevation beam angles corresponding to the variable node, each of the updated aggregate messages being computed as a sum of (iii) a power term that is a function of transmit power levels for the variable node and (iv) a sum of the summary messages most recently passed to the variable node from check nodes other than the targeted check node, less (v) the minimum of all the summary messages most recently passed to the variable node from check nodes other than the targeted check node;

passing the updated aggregated messages to the respective check nodes;

repeating the computing of the summary messages, the passing of the summary messages, the computing of the updated aggregated messages, and the passing of the updated messages, until an iteration-stopping criterion is reached; and wherein the transmitted power levels for the variable nodes determined just prior to the iteration-stopping criterion represent the determined non-zero power levels for the beam sequences for the plurality of access nodes.

10. The method of claim 1, wherein the method is implemented in a distributed manner, in the plurality of access nodes, each access node computing messages for the variable nodes corresponding to the respective node.

11. The method of claim 10, wherein each of one or more of the access nodes performs the emulation of a corresponding subset of the plurality of wireless devices.

12. A system for jointly determining beam-sweeping patterns for synchronization signals transmitted in a region by each of a plurality of access nodes in a wireless network, wherein each access node is connected to a corresponding array of horizontally and/or vertically spaced antenna elements and is configured to sweep a synchronization signal in a node-specific beam sequence, using the corresponding array, where, for each access node, the node-specific beam sequence is defined by a sequence of power levels corresponding to distinct beam angles available to the access node, the system comprising one or more nodes adapted to:

model a total power function corresponding to a total power transmitted in the synchronization signals by the plurality of access nodes, for a given period, wherein said modeling of the total power function comprises modeling the total power function as a factor graph having a plurality of check nodes and variable nodes, each of the check nodes corresponding to one of a plurality of emulated virtual wireless devices in the region and each of the variable nodes corresponding to one of the access nodes and to one of the beam angles available to the one of the access nodes;

emulate the plurality of virtual wireless devices so as to implement quality-of-service constraints on synchronization signals received by the virtual wireless devices;

apply an iterative message-passing algorithm to the modeled total power function, to determine the sequence of power levels for each of the plurality of access nodes, so as to minimize the total power function, subject to one or more iteration-stopping criteria.

13. The system of claim 12, wherein the iterative message-passing algorithm is one of a min-sum algorithm, a max-sum algorithm, and a min-product algorithm.

14. The system of claim 12, wherein at least a first one of the nodes is an access node and is further adapted to transmit the synchronization signal, applying the determined sequences of non-zero power levels for that access node.

15. The system of claim 12, wherein the nodes are adapted to emulate the plurality of virtual wireless devices based on historical signal measurement data from wireless devices in the region, the historical signal measurement data comprising received signal strength data for synchronization signals transmitted by the plurality of access nodes.

16. The system of claim 15, wherein at least a portion of the historical signal measurement data corresponds to measurements made from full power sweeps of the synchronization by one or more of the access nodes.

17. The system of claim 15, wherein the nodes are further adapted to, subsequent to said modeling, emulating, and applying:

update the historical signal measurement data, using signal strength data from wireless devices for synchronization signals transmitted by the plurality of access nodes using the determined sequences of non-zero power levels; and repeat said modeling, emulating, and applying to obtain updated sequences of non-zero power levels for one or more of the access nodes.

18. The system of claim 12, wherein the nodes are adapted to apply the iterative message-passing algorithm to the modeled total power function by:

generating, for each variable node, an initial aggregate message targeted to each check node that corresponds to a virtual wireless device that, based on historical signal quality data, is deemed able to receive a synchronization signal transmitted by the access node corresponding to the variable node at the combination of azimuth and elevation beam angles corresponding to the variable node, each of the initial aggregate messages consisting of a variable node power function that is a function of transmit power levels for the variable node;

passing the initial aggregate messages to the respective check nodes;

computing, for each check node, a summary message targeted to each of a set of variable nodes that, based on historical signal quality data, correspond to beams that can be received by the check node, each summary message being a function of transmit power levels for the targeted variable node and having a value, for each transmit power of the targeted variable node, computed as the minimum, over all transmit power levels for all neighboring variable nodes except the targeted variable node, of the sum of (i) an indicator function for the check node and (ii) the aggregate messages most recently received by the check node from all the variable nodes in the set other than the targeted variable node, wherein the indicator function for the check node is a function of the transmit power level for the targeted variable node and provides a zero for a given transmit power level for the targeted variable node if the signal quality for any of the beams that can be received by the check node, as hypothesized based on the transmit power level for the targeted variable node and transmit power levels for the neighboring variable nodes other than the target variable nodes, exceeds a predetermined threshold, and provides a predetermined penalty value otherwise;

passing the summary messages to the respective variable nodes;

determining, for each variable node, a transmit power level that minimizes the sum of the summary messages most recently passed to the variable node;

computing, for each variable node, an updated aggregate message targeted to each of the check nodes that corresponds to a virtual wireless device that, based on historical signal quality data, is deemed able to receive a synchronization signal transmitted by the access node corresponding to the variable node at the combination of azimuth and elevation beam angles corresponding to the variable node, each of the updated aggregate messages being computed as a sum of (iii) a power term that is a function of transmit power levels for the variable node and (iv) a sum of the summary messages most recently passed to the variable node from check nodes other than the targeted check node, less (v) the minimum of all the summary messages most recently passed to the variable node from check nodes other than the targeted check node;

passing the updated aggregated messages to the respective check nodes;

repeating the computing of the summary messages, the passing of the summary messages, the computing of the updated aggregated messages, and the passing of the updated messages, until an iteration-stopping criterion is reached; and wherein the transmit power levels for the variable nodes determined just prior to the iteration-stopping criterion represent the determined non-zero power levels for the beam sequences for the plurality of access nodes.

19. The system of claim 12, wherein the nodes are adapted to emulate the plurality of virtual wireless devices such that the emulating ignores interference.

20. The system of claim 19, wherein the nodes are adapted to apply the iterative message-passing algorithm to the modeled total power function by:

generating, for each variable node, an initial aggregate message targeted to each check node that corresponds to a virtual wireless device that, based on historical signal quality data, is deemed able to receive a synchronization signal transmitted by the access node corresponding to the variable node at the combination of azimuth and elevation beam angles corresponding to the variable node, each of the initial aggregate messages consisting of a variable node power function that is a function of transmitted power levels for the variable node;

passing the initial aggregate messages to the respective check nodes;

computing, for each check node, a summary message targeted to each of a set of variable nodes that, based on historical signal quality data, correspond to beams that can be received by the check node, each summary message being computed as (i) a zero if the beam power for the variable node exceeds a minimum power level needed for the corresponding beam to serve the virtual node corresponding to the check node and, otherwise, (b) as the minimum, over all the aggregate messages most recently received by the check node from all the variable nodes in the set other than the targeted variable node, of the values of the aggregate messages in ranges of the aggregate messages in which the transmit power of the corresponding variable node exceeds a minimum power level needed for the corresponding variable node to serve the virtual node corresponding to the check node;

passing the summary messages to the respective variable nodes;

determining, for each variable node, a transmitted power level that minimizes the sum of the summary messages most recently passed to the variable node;

computing, for each variable node, an updated aggregate message targeted to each of the check nodes that corresponds to a virtual wireless device that, based on historical signal quality data, is deemed able to receive a synchronization signal transmitted by the access node corresponding to the variable node at the combination of azimuth and elevation beam angles corresponding to the variable node, each of the updated aggregate messages being computed as a sum of (iii) a power term that is a function of transmitted power levels for the variable node and (iv) a sum of the summary messages most recently passed to the variable node from check nodes other than the targeted check node, less (v) the minimum of all the summary messages most recently passed to the variable node from check nodes other than the targeted check node;

passing the updated aggregated messages to the respective check nodes;

repeating the computing of the summary messages, the passing of the summary messages, the computing of the updated aggregated messages, and the passing of the updated messages, until an iteration-stopping criterion is reached; and wherein the transmitted power levels for the variable nodes determined just prior to the iteration-stopping criterion represent the determined non-zero power levels for the beam sequences for the plurality of access nodes.

21. The system of claim 12, wherein each of one or more of the nodes corresponds to a respective one of the access nodes, and wherein each of the one or more of the nodes performs the emulation of a corresponding subset of the plurality of wireless devices.

22. A computer program product, stored on a non-transitory computer readable storage medium, for jointly determining beam-sweeping patterns for synchronization signals transmitted in a region by each of a plurality of access nodes in a wireless network, wherein each access node is connected to a corresponding array of horizontally and/or vertically spaced antenna elements and is configured to sweep a synchronization signal in a node-specific beam sequence, using the corresponding array, where, for each access node, the node-specific beam sequence is defined by a sequence of power levels corresponding to distinct beam angles available to the access node, the computer program product comprising instructions for execution by one or more nodes, the instructions comprising instructions for:

modeling a total power function corresponding to a total power transmitted in the synchronization signals by the plurality of access nodes, for a given period, wherein said modeling of the total power function comprises modeling the total power function as a factor graph having a plurality of check nodes and variable nodes, each of the check nodes corresponding to one of a plurality of emulated virtual wireless devices in the region and each of the variable nodes corresponding to one of the access nodes and to one of the beam angles available to the one of the access nodes;

emulating the plurality of virtual wireless devices so as to implement quality-of-service constraints on synchronization signals received by the virtual wireless devices;

applying an iterative message-passing algorithm to the modeled total power function, to determine the sequence of power levels for each of the plurality of access nodes, so as to minimize the total power function, subject to one or more iteration-stopping criteria.

* * * * *